United States Patent
Reece

(10) Patent No.: US 9,891,393 B2
(45) Date of Patent: Feb. 13, 2018

(54) IMAGING THROUGH OPTICAL FIBERS FOR COUPLING OPTIMIZATION

(71) Applicant: Empire Technology Development LLC, Wilmington, DE (US)

(72) Inventor: Peter J. Reece, Blaxland (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 835 days.

(21) Appl. No.: 14/340,511

(22) Filed: Jul. 24, 2014

(65) Prior Publication Data

US 2016/0363735 A1    Dec. 15, 2016

(51) Int. Cl.
| | |
|---|---|
| *G01P 3/36* | (2006.01) |
| *G02B 6/42* | (2006.01) |
| *G02B 27/00* | (2006.01) |
| *G02B 26/06* | (2006.01) |
| *G02B 27/09* | (2006.01) |
| *G02B 6/34* | (2006.01) |

(52) U.S. Cl.
CPC ........... *G02B 6/4221* (2013.01); *G02B 26/06* (2013.01); *G02B 27/0068* (2013.01); *G02B 27/0916* (2013.01); *G02B 6/34* (2013.01); *G02B 6/4212* (2013.01)

(58) Field of Classification Search
CPC .......................... G02B 26/06; G02B 27/0916; G02B 27/0068; G02B 6/4221; G02B 6/34; G02B 6/4212
USPC .......................................................... 356/29
See application file for complete search history.

(56) References Cited

U.S. PATENT DOCUMENTS

| | | | | |
|---|---|---|---|---|
| 4,984,885 A | * | 1/1991 | Ortiz, Jr. .............. | G02B 6/4296 250/201.4 |
| 5,383,118 A | | 1/1995 | Nguyen | |

(Continued)

FOREIGN PATENT DOCUMENTS

JP    2008026370 A    2/2008

OTHER PUBLICATIONS

Bertolotti, J., "Noninvasive imaging through opaque scattering layers," Nature, vol. 491, pp. 232-234, Nov. 2012.

(Continued)

*Primary Examiner* — Mark Hellner
(74) *Attorney, Agent, or Firm* — Turk IP Law, LLC

(57) ABSTRACT

Technologies are generally provided to establish imaging through an optical fiber to enhance optical coupling between an optoelectronic device and the optical fiber. Imaging may be established by determining transmission properties of the optical fiber based on an observed light pattern, and applying a phase mask to input light based on the transmission properties to produce a focused light at the output end of the optical fiber. The focused light may be employed to determine a position and orientation of the optoelectronic device relative to the optical fiber by scanning the focused light and collecting light reflected from the scanning of the optoelectronic device at a charge-coupled device (CCD) camera and generating an image of the optoelectronic device. The position and orientation of the target device may be adjusted employing precision alignment tools to enhance alignment of the target device with the optical fiber for optimal coupling.

20 Claims, 7 Drawing Sheets

(56) References Cited

U.S. PATENT DOCUMENTS

| | | | | |
|---|---|---|---|---|
| 5,621,831 | A * | 4/1997 | Staver | G02B 6/4222 250/227.2 |
| 6,636,535 | B1 * | 10/2003 | Iwashita | G01J 1/4257 356/344 |
| 8,194,248 | B2 | 6/2012 | Bhatia et al. | |
| 2006/0209297 | A1 * | 9/2006 | Biet | G01B 11/272 356/153 |
| 2008/0240181 | A1 * | 10/2008 | Shibatani | G02B 7/021 372/29.014 |

OTHER PUBLICATIONS

Cizmar, T. and Dholakia, K., "Exploiting multimode waveguides for pure fibre-based imaging," Nat Commun, vol. 3, No. 1027, pp. 1-9 Aug. 2012.

Conkey, D. B., et al., "High-speed scattering medium characterization with application to focusing light through turbid media," Opt. Express, vol. 20, No. 2, pp. 1733-1740 Jan. 2012.

Freund, I., "Looking through walls and around corners," Physica A: Statistical Mechanics and its Applications, vol. 168, No. 1, pp. 49-65 (1990).

Goodman, J. W., et al., "Wavefront-Reconstruction Imaging Through Random Media," Applied Physics Letters, vol. 8, pp. 311-313 (1966).

Kirkpatrick, S.M. et al., "Holographic recording using two-photon-induced photopolymerization," Appl. Phys., vol. A 69, pp. 461-464 (1999).

Vellekoop, I. M. and Mosk, A. P., "Focusing coherent light through opaque strongly scattering media," Opt. Lett., vol. 32, pp. 2309-2311 Aug. 15, 2007.

Yariv, A., "On transmission and recovery of three-dimensional image information in optical waveguides," J. Opt. Soc. Am., vol. 66, No. 4, pp. 301-306 (1976).

* cited by examiner

COMPUTER PROGRAM PRODUCT 600

SIGNAL-BEARING MEDIUM 602

604 AT LEAST ONE OF

ONE OR MORE INSTRUCTIONS TO ESTABLISH DIRECT IMAGING THROUGH AN OPTICAL FIBER;
    ONE OR MORE INSTRUCTIONS TO INTERROGATE A POSITION AND ORIENTATION OF A TARGET DEVICE RELATIVE TO AN OUTPUT END OF THE OPTICAL FIBER; AND
    ONE OR MORE INSTRUCTIONS TO ADJUST ALIGNMENT OF THE TARGET DEVICE TO ENHANCE ALIGNMENT OF THE TARGET DEVICE WITH THE OPTICAL FIBER.

| COMPUTER-READABLE MEDIUM 606 | RECORDABLE MEDIUM 608 | COMMUNICATIONS MEDIUM 610 |

IMAGING THROUGH OPTICAL FIBERS FOR COUPLING OPTIMIZATION

BACKGROUND

Unless otherwise indicated herein, the materials described in this section are not prior art to the claims in this application and are not admitted to be prior art by inclusion in this section.

Optical fibers are widely used in fiber-optic communications to permit transmission over longer distances and at higher bandwidths than other forms of communication. Fibers are used instead of metal wires because signals travel along them with less loss and are also immune to electromagnetic interference. It is often necessary to align an optical fiber with another optical fiber, or with an optoelectronic device such as a light-emitting diode, a laser diode, a sensor, an optical router, or a modulator. Optimal alignment of optoelectronic devices with optical fibers is important for effective coupling to achieve desired transmission effects from the optical fiber to the optoelectronic devices.

There are some constraints on optical alignment of active optoelectronic devices in order to make effective optical interconnects. Effective light coupling between an optical fiber and an emitter and/or receiver may require very precise alignment. Current alignment techniques may be costly and time consuming. For example, some alignment techniques involve using multi-axis translation stages to adjust the optoelectronic devices while receiving active feedback from the optoelectronic devices, which is an expensive and inefficient technique. An additional challenge involves a mode mismatch between laser diode output powers and optical fibers, which can lead to significant power losses between fibers and target optoelectronic devices when connected.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describe establishment of imaging through an optical fiber to enhance optical coupling between an optoelectronic device and the optical fiber.

According to some examples, methods to enhance optical coupling between a target device and an optical fiber are provided. An example method may include establishing direct imaging through the optical fiber to generate a real-time image of a target device positioned near an output end of the optical fiber, interrogating a position and an orientation of a target device to be coupled to the output end of the optical fiber based on the real-time image of the target device, and adjusting the position and the orientation of the target device to enhance an alignment of a target device for coupling with the optical fiber.

According to other examples, methods to enhance optical coupling between a target device and an optical fiber are provided. An example method may include establishing direct imaging through the optical fiber to generate a real-time image at an output end of the optical fiber employing an input light directed through an input end of the optical fiber, and interrogating a position and an orientation of a target device coupled via an optical material to the output end of the optical fiber based on the real-time image at the output end of the optical fiber. The example method may also include determining a misalignment of the target device relative to the output end of the optical fiber, and directing an index adjustment light through the optical fiber to adjust a refractive index of the optical material to compensate for the determined misalignment.

According to further examples, systems to provide direct imaging through an optical fiber for coupling optimization with a target device are described. An example system may include an optical fiber, an input light configured to be directed through an input end of the optical fiber to establish direct imaging through the optical fiber, and a target device to be coupled to an output end of the optical fiber, where a position and an orientation of a target device are adjusted to enhance an alignment of the target device for coupling with the output end of the optical fiber based on the established direct imaging.

According to some embodiments, systems to provide direct imaging through an optical fiber for coupling optimization with a target device are described. An example system may include the optical fiber, an input light configured to be directed through an input end of the optical fiber to establish direct imaging through the optical fiber, a controller configured to control the input light, and a target device optically coupled via an optical material to an output end of the optical fiber. A misalignment of the target device relative to the output end of the optical fiber may be determined based on the established direct imaging, and an optical property of the optical material may be adjusted to compensate for the determined misalignment.

According to other embodiments, devices to enhance alignment of a target device with an optical fiber are described. An example device may include an imaging device configured to enable direct imaging through the optical fiber optically coupled via an optical material at an output end of the optical fiber to a target device, and a microscope objective configured to direct an input light from a light source through an input end of the optical fiber. The example device may also include a controller configured to control the input light to adjust an optical property of the optical material to compensate for a determined misalignment of the target device with the optical fiber.

According to further embodiments, apparatuses to enhance alignment of a target device with an optical fiber are described. An example apparatus may include an input light configured to be directed through an input end of an optical fiber to establish direct imaging through the optical fiber, a controller configured to control an index adjustment light, and a target device optically coupled via an optical material to an output end of the optical fiber. A misalignment of the target device relative to the output end of the optical fiber may be determined based on the established direct imaging, and an index adjustment light may be configured to adjust an optical property of the optical material to compensate for the determined misalignment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 illustrates a block diagram of an example computer program product;

Figure 1:
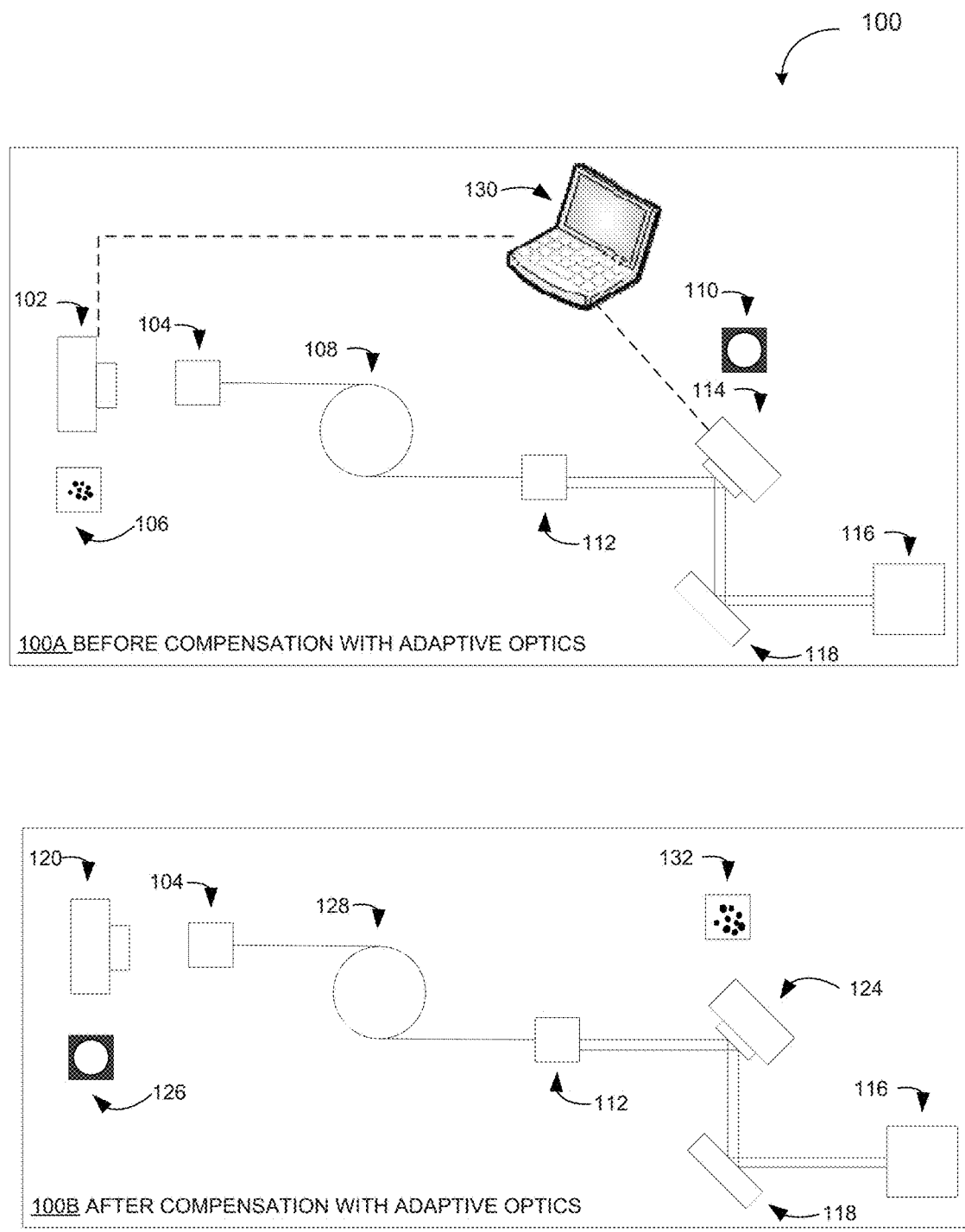
FIG. 1 illustrates an example configuration to establish direct imaging through an optical fiber.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to compositions, methods, apparatus, systems, and/or devices related to enable direct imaging through an optical fiber for coupling optimization with a target optoelectronic device.

Briefly stated, technologies are generally provided to establish imaging through an optical fiber to enhance optical coupling between an optoelectronic device and the optical fiber. Imaging may be established by determining transmission properties of the optical fiber based on an observed light pattern, and applying a phase mask to input light based on the transmission properties to produce a focused light at the output end of the optical fiber. The focused light may be employed to determine a position and orientation of the optoelectronic device relative to the optical fiber by scanning the focused light and collecting light reflected from the scanning of the optoelectronic device at a charge-coupled device (CCD) camera, and generating an image of the optoelectronic device. The position and orientation of the target device may be adjusted employing precision alignment tools to enhance alignment of the target device with the optical fiber for optimal coupling.

FIG. 1 illustrates an example configuration to establish direct imaging through an optical fiber, arranged in accordance with at least some embodiments as described herein.

As demonstrated in a diagram 100, imaging through an optical fiber 108 may be established by directing an input light through the optical fiber 108 and observing a light pattern produced at an output end of the optical fiber. Configuration 100A illustrates an example setup to establish imaging through the optical fiber 108 before compensation with adaptive optics, and configuration 100B illustrates an example setup where imaging through the optical fiber 128 is established after compensation with adaptive optics.

In configuration 100A, the optical fiber 108 may be wrapped one or more times around a spool in a predefined fixed arrangement in order to maintain the optical fiber 108 under a predetermined tension. Transmission properties of the optical fiber are highly dependent on geometric factors, and maintaining the optical fiber 108 in a fixed arrangement under a predefined tension may prevent unwanted changes to the transmission properties of the optical fiber during alignment. The optical fiber 108 may be a single mode fiber or a multi-mode fiber. The single mode fiber may be an optical fiber having a smaller core diameter, in a range from about 3 µm to about 12 µm, and designed to carry a single mode of light. The multi-mode fiber may be an optical fiber having a larger core diameter, in a range from about 50 µm to about 100 µm, and supporting more than one propagation mode through the optical fiber.

In the configuration 100A, an input light source 116 may direct an input light, such as a laser beam having a uniform beam profile, through an input end of the optical fiber 108. The input light may be reflected from a mirror 118 and an adaptive optical component, such as a spatial light modulator (SLM) 114, and directed into the input end of the optical fiber 108 through a microscope objective 112. A light pattern 106 may be observed at an output end of the optical fiber 108, and the light pattern may be recorded using a charge coupled device (CCD) camera 102. In some embodiments, the light at the output end of the optical fiber 108 may be directed through another microscope objective 104. The recorded light pattern 106 may be a complex speckle pattern representing interference between optical modes of different amplitudes and phases that are determined by propagation through the optical fiber.

The adaptive optical component, such as the SLM 114, may be a programmable, diffractive optical element that can modulate a phase and/or amplitude of an incident optical wave-front with a desired phase and/or amplitude mask. Phase only modulation may be a preferred mode of operation as it can utilize the full power of the input light to achieve high diffraction efficiencies greater than 90%, for example. The SLM 114 may comprise a two dimensional array of discrete elements with tunable optical properties that are addressed through an applied voltage, where the SLM 114 may be designed for a specific wavelength such that a $2n$ phase retardation can be achieved over the full tunable range of the elements. In one example, the SLM 114 may comprise a liquid crystal display mounted on a silicon based complementary metal-oxide-semiconductor (CMOS) control chip coated with a highly reflective dielectric mirror. Addressing the individual pixel elements with an applied voltage may tune the refractive index of the liquid crystal above the electrode, thereby providing the local phase retardation of the wave-front. The control chip may be computer programmable and updated based on the desired wave-front. In another example, the SLM 114 may include a fast switching ferro-electric tunable element. While many SLMs are reflective based, some SLMs may be transmission based however, transmission based SLMs may have a lower diffraction efficiency compared to reflective models because they do not provide phase only modulation as some amplitude modulation is coupled to the phase change.

A series of different phase masks 110 may be iteratively applied to the input light to alter the pattern of input light. A phase mask may be a computer generated two dimensional map, where each element corresponds to a phase and/or amplitude change that, when applied to a specific location on the incoming light-field, produces the desired wave-front modulation. An example phase mask is an 8-bit gray scale image where a level of each pixel (0-255) may be proportional to the desired phase shift (e.g., 255 corresponds to $2\pi$ phase shift). The series of different phase masks 110 may be applied at the SLM 114, where the SLM physically encodes the phase mask onto the wave-front. A resultant light pattern of the input light for each phase mask may be recorded by the CCD camera 102, and transmission properties of the optical fiber 108 may be determined based on examination of the resultant output light patterns for each applied phase mask.

The SLM 114 may be coupled to the CCD camera 102 through a computing device 130 such that the light pattern measured at the output of the optical fiber 108 by the CCD camera 102 may be used to interpret how the wave-front is modified. The transmission properties of the optical fiber 108 may be determined employing selected algorithms to map the transmission properties of the optical fiber. In an example embodiment, mapping the transmission matrix of a diffracting and/or scattering medium may be based on determining an input phase mask required to create a single focal point within the imaging plane. Once focusing has been established, both the input phase object applied to the SLM 114 and an output phase map at the end of the optical fiber 108 are known and can be used to calculate the transmission matrix. The algorithms for determining the transmission matrix may be implemented in an iterative process of determining the phase object on the SLM 114. For example, an initial phase mask may be applied to the SLM 114 and an intensity pattern at the end of the optical fiber 108 may be measured. A cost function may be established, which relates a difference between the target intensity profile and the actual measured profile. An algorithm may then be used to update the input phase object to minimize the cost function through successive iterations. Some example algorithms may include a genetic algorithm, a continuous sampling algorithm, a transmission matrix, a partition algorithm, or other similar mathematical algorithm enabling determination of optical fiber transmission properties. The various mathematical algorithms have differing abilities to converge on the target intensity patterns, which relates to the details of the transmission matrix. Different target objects (e.g., multiple focal spots) can also been used to improve the speed and accuracy. Some implementations may utilize fluorescence intensity of fluorescently labelled objects as a cost function instead of directly measuring the laser spot intensity. There are also recursive methods that may be used for calculating the transmission matrix.

As illustrated in configuration 100B, once the transmission properties of the optical fiber 128 have been established, the optical fiber 128 may be used as an optical imaging element. A phase mask 132 may be applied to the input light at the spatial light modulator 124 to correct for perturbations introduced by the transmission properties of the optical fiber 128, thereby enabling control of a profile of the input light to produce a focused light 126 profile at the output end of the optical fiber 128. The focused light 126 profile at the output end of the optical fiber 128 may enable the optical fiber 128 to be used as an imaging device. The focused light 126 at the output end of the optical fiber may be scanned over an area of interest to build up and image of the area of interest. In a further embodiment, additional phase masks may be applied to the input light in order to enable manipulation of the light beam at the output end of the optical fiber. Example phase masks may include a Fresnel zone-plate for focusing the input light, or a diffraction grating for input light displacement.

Figure 2:
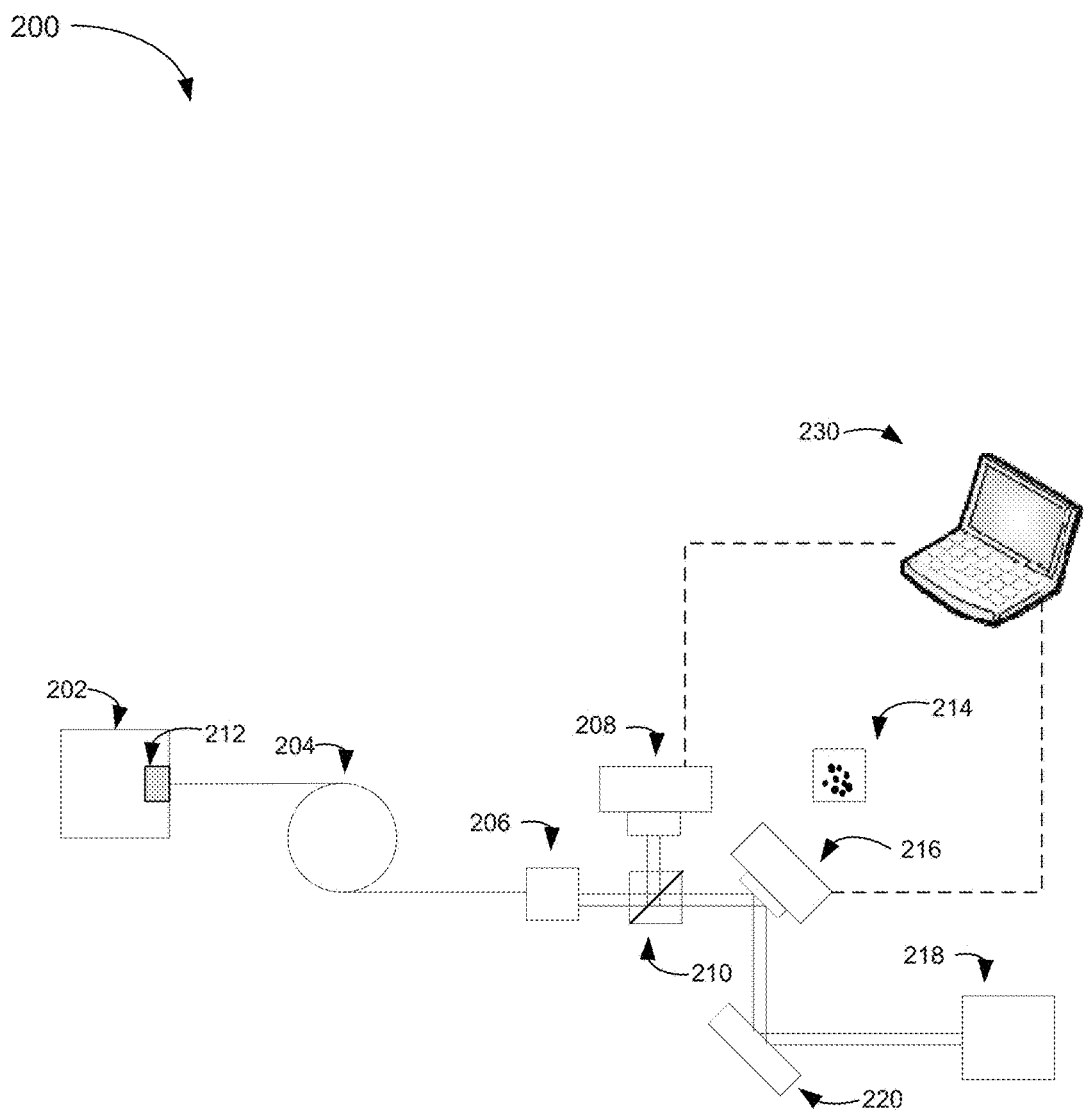
FIG. 2 illustrates an example adjustment of a position of a target device to achieve optimal coupling between the target device and optical fiber.

FIG. 2 illustrates an example adjustment of a position of a target device to achieve optimal coupling between the target device and optical fiber, arranged in accordance with at least some embodiments as described herein.

As demonstrated in a diagram 200, after characterizing transmission properties of an optical fiber 204 and establishing direct imaging through the optical fiber 204, a target optoelectronic device 202 to be coupled with the optical fiber 204 may be placed in a vicinity of the output end of the optical fiber 204. The optical fiber 204 may be arranged in a configuration as described above in conjunction with FIG. 1, in which the optical fiber 204 is maintained in a fixed position under a predefined fixed tension. The optoelectronic device 202 may be mounted on a translation stage to enable the optoelectronic device 202 to be manually moved in relation to the optical fiber 204, while the optical fiber 204 remains in a fixed position. In some embodiments, the optoelectronic device 202 may include an optical connector 212 to enable coupling with the optical fiber 204.

A CCD camera 208 may be positioned near the input end of the optical fiber 204. The CCD camera 208 may be configured to collect light reflected from the optoelectronic device 202 at the output end of the optical fiber 204 via a non-polarizing beam splitter 210 in an epi-illumination configuration. The light reflected from the scan of optoelectronic device 202 at the CCD camera 208 may be transformed into an image of the optoelectronic device 202.

As previously described, an input light source 218 may direct an input light through the input end of the optical fiber 204, for example by reflecting the input light from a mirror 220 and a spatial light modulator 216, and into the input end of the optical fiber 204 through a microscope objective 206. The input light may be a laser beam, for example having a uniform beam profile. In one example, the laser beam may be in a single transverse mode having a Gaussian beam profile. An example input light may include a titanium doped sapphire laser, a semiconductor laser, a near-infrared laser, a visible laser having a wavelength in a range from 400 to 2000 nm. The input light may be directed through the optical fiber 204 in a continuous imaging mode to initially establish the direct imaging of the optical fiber 204 by observing and recording light patterns of the input light at the output end of the optical fiber 204.

A phase mask 214 may be applied to the spatial light modulator 216 to produce a focused light at the output end of the fiber that may be scanned within a field of view over the optoelectronic device 202 to generate an image of the optoelectronic device 202. The phase mask to produce the focused light may be selected based on the determined transmission properties of the optical fiber 204 as previously described in FIG. 1. One or more imaging modalities may be employed to generate the image of the optoelectronic device 202 at the output end of the optical fiber 204. Example imaging modalities may include confocal microscopy, bright-field microscopy, dark-field microscopy, and phase-contrast microscopy.

In an example embodiment, the generated image of the optoelectronic device 202 may enable interrogation of a position and an orientation of the optoelectronic device 202 relative to a central axis of the optical fiber 204. The interrogated position and orientation of the optoelectronic device 202 may be used to enable precision alignment tools to guide the translation stage to align the optoelectronic device 202 with the output end of the optical fiber 204. After the optoelectronic device 202 is aligned with the output end of the optical fiber 204, the optoelectronic device 202 may be affixed with the output end of the optical fiber 204 with an optical material, such as an optical adhesive to couple the optoelectronic device 202 and optical fiber 204 together. An example optical adhesive may include a bonding agent designed to cure when exposed to ultraviolet light.

In a system according to some embodiments, a controller 230 may be integrated with the translation stage to enable the precision alignment tools to adjust the translation stage to align the optoelectronic device 202 with the output end of the optical fiber 204 with an accuracy of about 1 micron ($\mu$m). The controller 230 may also be configured to control the input light source 218 to direct the input light through the input end of the optical fiber 204, and to receive data of the optoelectronic device 202 from the CCD camera 208 to transform the received data into the image of the optoelectronic device 202. The controller 230 may be in communication with the CCD camera 208 and/or the spatial light modulator 216 to facilitate transmission of light and collecting light to produce an image based on the collected light. The controller 230 may be a computing device such as a computer. Furthermore, after coupling the optoelectronic device 202 and optical fiber 204 together, the alignment of the optoelectronic device 202 and optical fiber 204 together may be further adjusted and optimized by adjusting a refractive index of the optical material as discussed in more detail in FIG. 3.

Figure 3A:
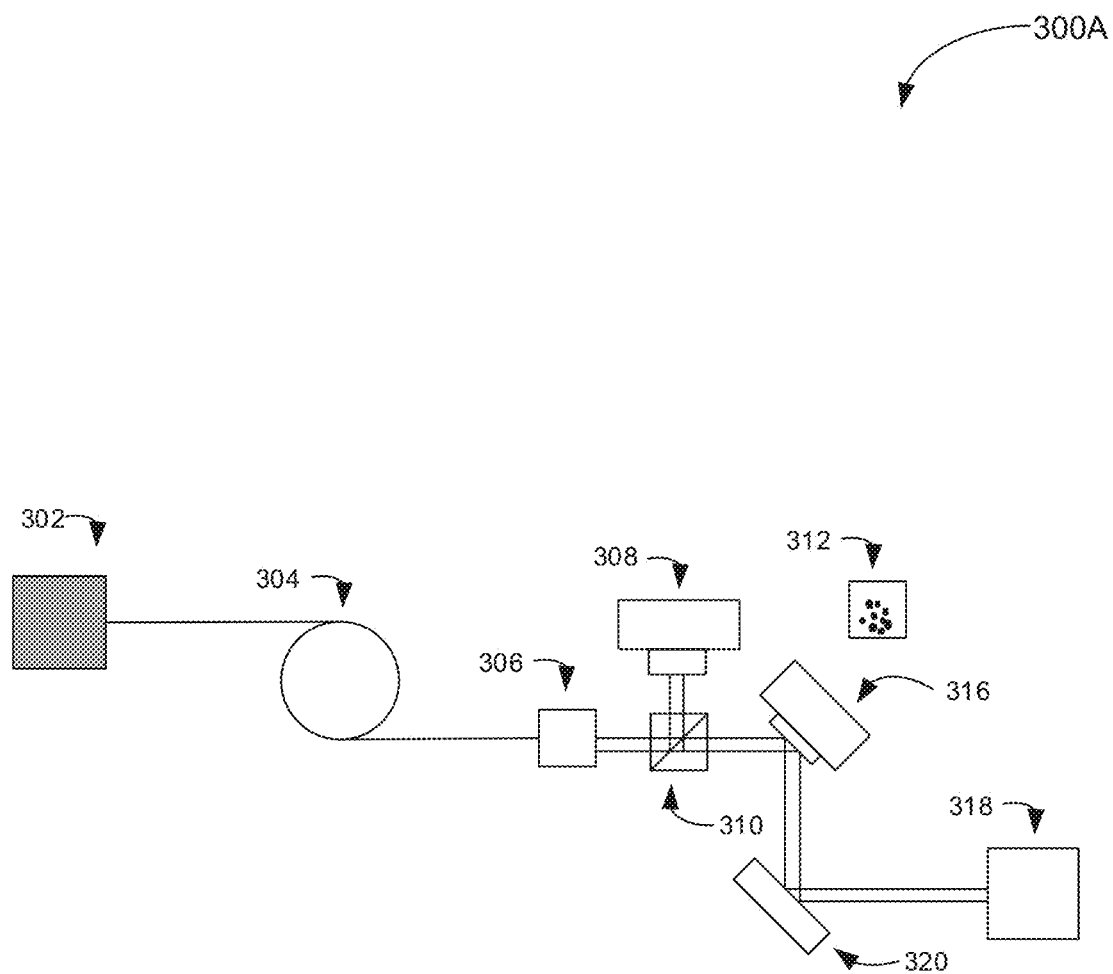
FIGS. 3A and 3B illustrate an example adjustment of a misalignment of a target device coupled with an optical fiber by adjusting a refractive index of an optical material.
Figure 3B:
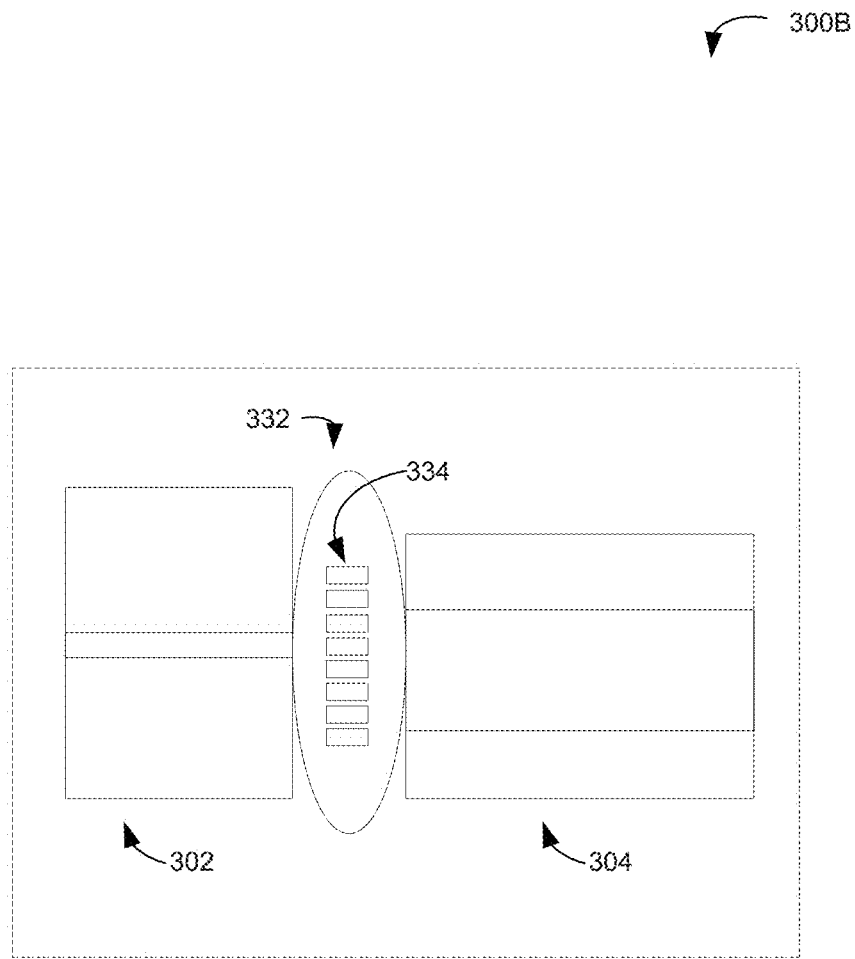

FIGS. 3A and 3B illustrate an example adjustment of a misalignment of a target device coupled with an optical fiber by adjusting a refractive index of an optical material, arranged in accordance with at least some embodiments as described herein.

As demonstrated in diagram 300A, in other embodiments, a connection between an optoelectronic device 302 and an optical fiber 304 may have been previously established employing techniques such as course alignment techniques, and direct imaging through the optical fiber 304 may be employed to improve the alignment and connection between the optoelectronic device 302 and the optical fiber 304.

In a system according to some embodiments, in order to improve an alignment between a previously coupled optoelectronic device 302 and optical fiber 304, transmission properties of the optical fiber 304 may be determined employing a similar technique as described above in conjunction with FIG. 2. For example, direct imaging may be established through the optical fiber 304 to generate a real-time image at an output end of the optical fiber 304. However, since the output end of the optical fiber 304 is inaccessible as it is coupled with the optoelectronic device 302, the direct imaging may be established based on observation of light patterns reflected from the coupled optoelectronic device 302.

As previously described, input light from a light source 318 may be reflected from a mirror 320 and a spatial light modulator 316, and directed into the input end of the optical fiber 304 through a microscope objective 306. The input light may be reflected off the coupled optoelectronic device 302, and a reflected light pattern may be observed using a CCD camera 308 coupled with a beam splitter 310. Subsequently, a series of different phase masks 312 may be iteratively applied to the input light to alter the pattern of input light. The series of different phase masks 312 may be applied at the spatial light modulator 316, and resultant reflected light pattern of the input light for each phase mask may be recorded by the CCD camera 308. Transmission properties of the optical fiber 304 may be determined based on examination of the resultant output light patterns for each applied phase mask. A focusing phase mask may be applied to the spatial light modulator to produce a focused light at the output end of the fiber that may be used to generate an image of the optoelectronic device 302. The phase mask to produce the focused light may be selected based on the determined transmission properties of the optical fiber 304. Additionally, the applied phase mask may be configured to be adjustable in response to direct imaging data. The focused light may enable interrogation of a position and orientation of the optoelectronic device 302 relative to the output end of the optical fiber 304 in order to determine a misalignment of the optoelectronic device 302 with the output end of the optical fiber 304.

As illustrated in a diagram 300B, in a system according to some embodiments, after determination of the misalignment of the optoelectronic device 302 with the output end of the optical fiber 304, a refractive index of an optical material 332 connecting the optoelectronic device 302 with the optical fiber 304 may be adjusted to compensate for the determined misalignment. The refractive index may be adjusted by directing an index adjustment light through the optical fiber 304. The index adjustment light may be an input light source in a pulsed mode, where the pulsed mode may write a diffraction pattern 334 into the optical material 332 to adjust the refractive index of the optical material 332.

In some embodiments, the input light may be initially directed through the optical fiber 304 in a continuous imaging mode to establish the direct imaging of the optical fiber 304 by observing and recording light patterns of the input light at the output end of the optical fiber 304. The input light may be converted to a pulse mode through the optical fiber 304 in order to write the diffraction pattern 334 into the optical material 332 to compensate for the determined misalignment. The diffraction pattern 334 may cause the input light reflected from the optoelectronic device 302 to be redirected into the optical fiber 304 to compensate for misalignment of the optoelectronic device 302 with the optical fiber 304. The diffraction pattern 334 may be written into the optical material 332 photochemically or photothermally using a laser directed through the optical fiber 304, for example. The process may be performed using a laser machining technique, such as directly applying a continuous wave ultraviolet (UV) laser directed through the optical fiber 304, or by employing two photon polymerization using a short-pulsed infrared laser (e.g., a mode-locked, titanium doped sapphire laser). The latter may be preferred, as the two photon polymerization process may create UV photons at a high intensity focus and may have exceptionally high spatial resolution of about 200 nm, for example. The short-pulsed infrared laser may be focused to different points at the output end of the optical fiber 304 and by controlling the dwell time or intensity at the different points, it may be possible to directly write the desired refractive index profile into the optical material 332.

Figure 4:
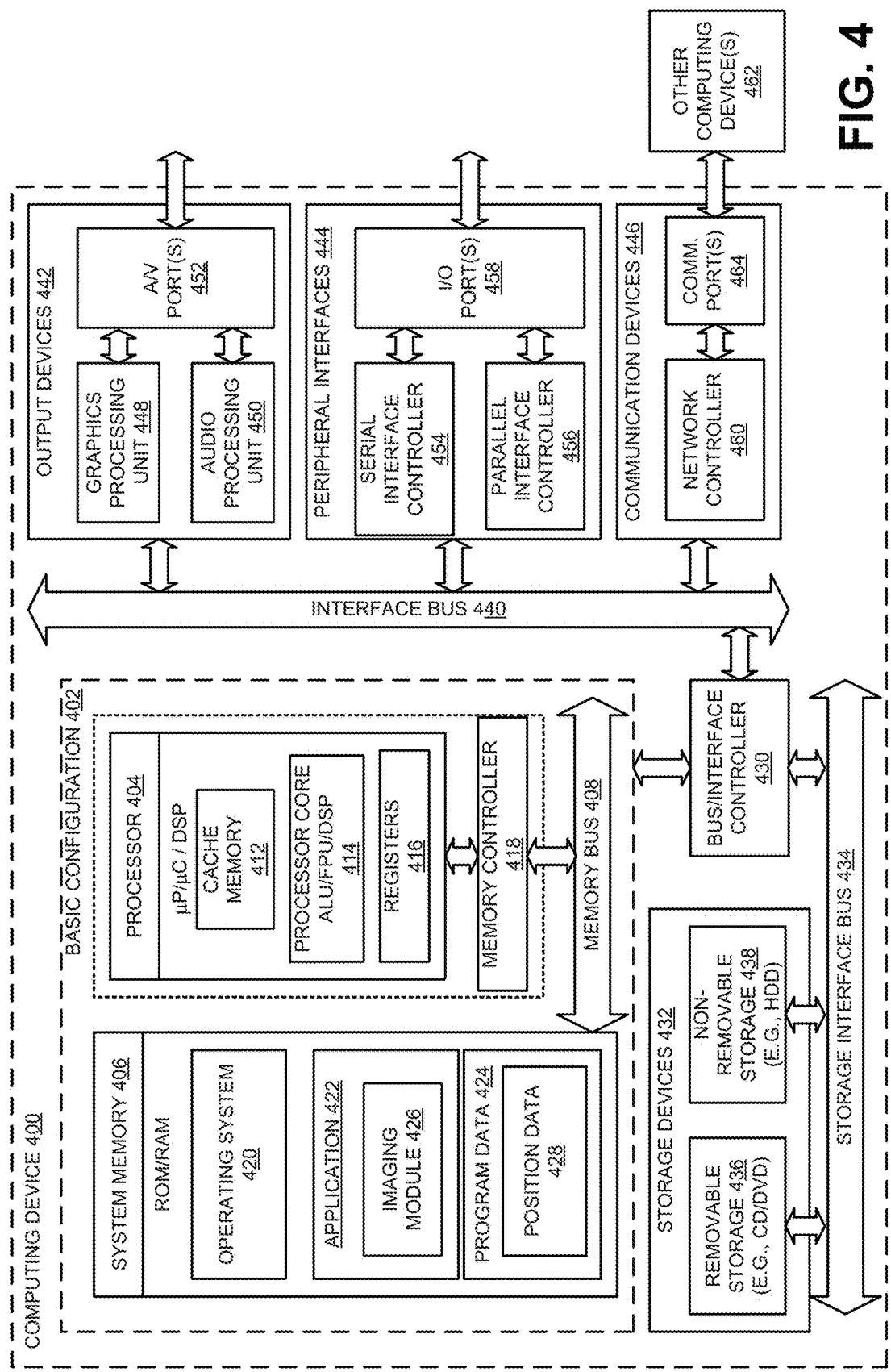
FIG. 4 illustrates a general purpose computing device, which may be used to enable direct imaging through an optical fiber for coupling optimization.

FIG. 4 illustrates a general purpose computing device, which may be used to enable direct imaging through an optical fiber for coupling optimization, arranged in accordance with at least some embodiments as described herein.

For example, the computing device 400 may be used as a server, desktop computer, portable computer, smart phone, special purpose computer, or similar device. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include an imaging module 426, which may be an integral part of the application 422 or a separate application on its own. The imaging module 426 may facilitate establishing direct imaging through an optical fiber, and interrogating a position and an orientation of a target device to enhance alignment of the target device for coupling with the optical fiber based on a captured real-time image of the target device, as described herein. The program data 424 may include, among other data, position data 428 related to the position and orientation of the target device relative to the output end of the optical fiber, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 446) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 446 includes a network controller 460, which may be arranged to facilitate communications with one or more other computing devices 462 over a network communication link via one or more communication ports 464. The one or more other computing devices 462 may include servers, client devices, smart appliances, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Figure 5:
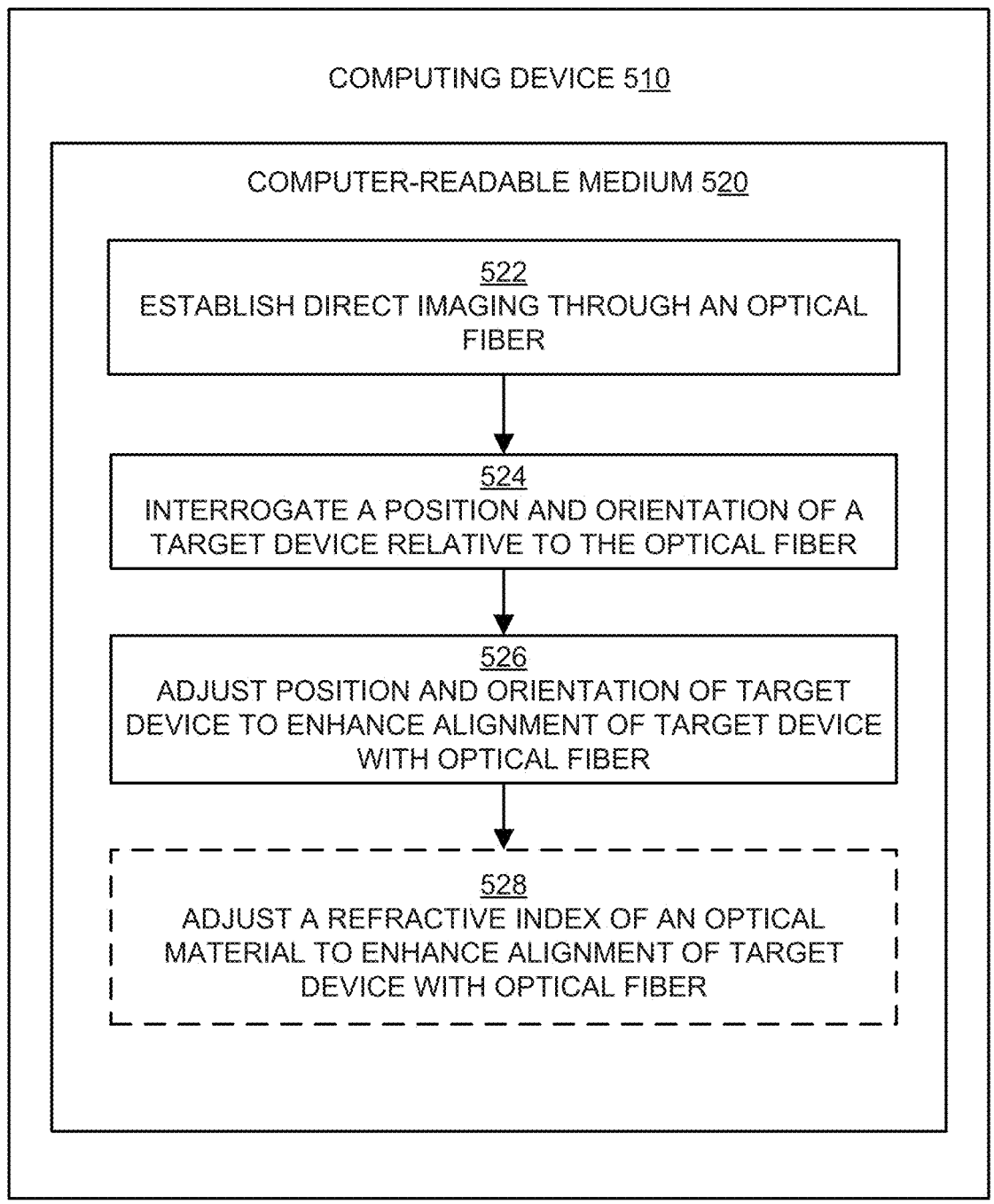
FIG. 5 is a flow diagram illustrating an example method to enable direct imaging through an optical fiber to enhance optical coupling between a target device and the optical fiber that may be performed by a computing device such as the computing device in FIG. 4.

Example embodiments may also include methods to enhance optical coupling between a target optoelectronic device and an optical fiber. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated FIG. 5 is a flow diagram illustrating an example method to enable direct imaging through an optical fiber to enhance optical coupling between a target device and the optical fiber that may be performed by a computing device such as the computing device in FIG. 4, arranged in accordance with at least some embodiments as described herein.

Example methods may include one or more operations, functions or actions as illustrated by one or more of blocks 522, 524, 526, and 528. The operations described in the blocks 522 through 528 may also be stored as computer-executable instructions in a computer-readable medium such as a computer-readable medium 520 of a computing device 510.

An example process to establish direct imaging through an optical fiber to enhance optical coupling between a target device and the optical fiber may begin with block 522, "ESTABLISH DIRECT IMAGING THROUGH AN OPTICAL FIBER," where an input light may be directed through an optical fiber to establish imaging through the optical fiber. The imaging may be established by observing a light pattern of the input light at the output end of the optical fiber, determining transmission properties of the optical fiber based on the observed light pattern, and applying a phase mask to the input light based on the determined transmission properties to produce a focused light at the output end of the optical fiber.

Block 522 may be followed by block 524, "INTERROGATE A POSITION AND ORIENTATION OF A TARGET DEVICE RELATIVE TO THE OPTICAL FIBER," where the focused light produced at the output end of the optical fiber may be employed to generate an image of a target device positioned near the output end of the optical fiber. A position and orientation of the target device relative to the output end of the optical fiber may be determined by scanning the focused light over the target device, and collecting light reflected from the scanning of the target device at a CCD camera. The collected reflected light may be transformed into an image of the target device, from which a position and orientation of the target device relative to the output end of the device may be determined.

Block 524 may be followed by block 526, "ADJUST POSITION AND ORIENTATION OF TARGET DEVICE TO ENHANCE ALIGNMENT OF TARGET DEVICE WITH OPTICAL FIBER," where the position and orientation of the target device may be adjusted to enhance alignment of the target device with the optical fiber for optimal coupling. The target device may be aligned with the optical fiber employing a precision alignment tool to adjust a translation stage on which the target device may be mounted. The translation stage may enable alignment of the target device with the optical fiber with about 1 micrometer (µm) accuracy.

Block 526 may be followed by optional block 528, "ADJUST A REFRACTIVE INDEX OF AN OPTICAL MATERIAL TO ENHANCE ALIGNMENT OF TARGET DEVICE WITH OPTICAL FIBER," where a misalignment of the target device relative to the output end of the optical fiber may be detected, and an index adjustment light may be directed through the optical fiber to adjust a refractive index of the optical material to compensate for the determined misalignment. The index adjustment light may be an additional input light source directed through the optical fiber pulsed laser beam. The index adjustment light may also be the original input light source converted from a continuous imaging mode to a pulse mode.

The blocks included in the above described process are for illustration purposes. Establishing direct imaging through an optical fiber to enhance optical coupling between a target optoelectronic device and the optical fiber may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 6 illustrates a block diagram of an example computer program product, arranged in accordance with at least some embodiments as described herein.

In some embodiments, as shown in FIG. 6, the computer program product 600 may include a signal bearing medium 602 that may also include one or more machine readable instructions 604 that, when executed by, for example, a processor may provide the functionality described herein. Thus, for example, referring to the processor 404 in FIG. 4, an imaging module 426 executed on the processor 404 may undertake one or more of the tasks shown in FIG. 6 in response to the instructions 604 conveyed to the processor 404 by the medium 602 to perform actions associated with establishing direct imaging through an optical fiber to enhance optical coupling between a target device and the optical fiber. Some of those instructions may include, for example, instructions to establish direct imaging through an optical fiber, interrogate a position and orientation of a target device relative to the optical fiber, adjust a position and orientation the target device to enhance alignment of the target device with the optical fiber, and/or adjust a refractive index of an optical material to enhance alignment of the target device with the optical fiber.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc.). Thus, for example, the program product 600 may be conveyed to one or more modules of the processor 404 of FIG. 4 by an RF signal bearing medium, where the signal bearing medium 602 is conveyed by the wireless communications medium 610 (for example, a wireless communications medium conforming with the IEEE 802.11 standard).

According to some examples, methods to enhance optical coupling between a target device and an optical fiber are provided. An example method may include establishing direct imaging through the optical fiber to generate a real-time image of a target device positioned near an output end of the optical fiber, interrogating a position and an orientation of a target device to be coupled to the output end of the optical fiber based on the real-time image of the target device, and adjusting the position and the orientation of the target device to enhance an alignment of a target device for coupling with the optical fiber.

In other examples, the target device may be an optoelectronic device including a light-emitting diode, a laser diode, a sensor, an optical router, and/or a modulator. An optical connector of the target device may be coupled with the optical fiber. Establishing direct imaging through the optical fiber may include directing an input light through an input end of the optical fiber, observing a light pattern of the input light at one of the output end and the input end of the optical fiber, determining transmission properties of the optical fiber based on the observed light pattern, and applying a phase mask to the input light based on the determined transmission properties to produce a focused light at the output end of the optical fiber.

In further examples, the phase mask may be selected to compensate for light transmission perturbations induced by the determined transmission properties of the optical fiber. The input light may be a laser beam having a uniform beam profile. The input light may be reflected from a spatial light modulator, and the reflected input light may be directed into the optical fiber through a microscope objective. The light pattern of the input light may be recorded at the output end of the optical fiber at a charge coupled device (CCD) camera, wherein the recorded light pattern may represent an interference between optical modes of different amplitudes and phases of the input light determined by a propagation of the input light through the optical fiber. Determining transmission properties of the optical fiber based on the observed light pattern may include iteratively applying a series of different phase masks to the input light, recording a resultant output light pattern for each phase mask, and determining the transmission properties of the optical fiber based on the resultant output light pattern for each phase mask. Determining the transmission properties of the optical fiber based on the resultant output light pattern for each phase mask may include employing a genetic algorithm, a continuous sampling algorithm, a transmission matrix, and/or a partition algorithm.

In yet further examples, the target device may be mounted in a vicinity of the output end of the optical fiber on a translation stage, where the translation stage may be a precision alignment tool configured to adjust the position and the orientation of the target device with at least 1 μm accuracy. Interrogating the position and the orientation of the target device may include applying one or more imaging modalities selected to generate an image of the target device, wherein the one or more imaging modalities may include a confocal microscopy, a bright-field microscopy, a dark-field microscopy, and/or a phase-contrast microscopy. A CCD camera may be positioned at an input end of the optical fiber to collect light reflected from the target device via a non-polarizing beam splitter in an epi-illumination configuration. Interrogating the position and the orientation of the target device may include scanning a produced focus over the target device at the output end of the optical fiber, collecting light reflected from the scanning of the target device at the CCD camera, and transforming the collected reflected light into an image of the target device. The optical fiber may be a single mode fiber or a multi-mode fiber. The target device may be affixed to the output end of the optical fiber with an optical material.

According to some embodiments, methods to enhance optical coupling between a target device and an optical fiber are provided. An example method may include establishing direct imaging through the optical fiber to generate a real-time image at an output end of the optical fiber employing an input light directed through an input end of the optical fiber, and interrogating a position and an orientation of a target device coupled via an optical material to the output end of the optical fiber based on the real-time image at the output end of the optical fiber. The example method may also include determining a misalignment of the target device relative to the output end of the optical fiber, and directing an index adjustment light through the optical fiber to adjust a refractive index of the optical material to compensate for the determined misalignment.

In other embodiments, a predetermined tension may be maintained on the optical fiber. The optical material may be an optical adhesive. Establishing direct imaging through the optical fiber may include observing a light pattern of the input light reflected from a surface of the target device coupled to the output end of the optical fiber, determining transmission properties of the optical fiber based on the observed light pattern, and applying a phase mask to the input light based on the determined transmission properties to produce a focused light at the output end of the optical fiber. Determining transmission properties of the optical fiber based on the observed light pattern may include iteratively applying a series of different phase masks to the input light, recording a resultant output light pattern for each phase mask, and determining the transmission properties of the optical fiber based on the recorded resultant output light pattern for each phase mask. Determining the transmission properties of the optical fiber may include employing a genetic algorithm, a continuous sampling algorithm, a transmission matrix, and/or a partition algorithm.

In further embodiments, the phase mask may be selected to compensate for light transmission perturbations induced by the determined transmission properties of the optical fiber. The input light may be a laser beam having a uniform beam profile. The input light may be configured to convert from a continuous imaging mode to a pulse mode. The index adjustment light may be a pulsed laser beam, where the laser beam may be selected from a solid state laser, a titanium doped sapphire laser, a semiconductor laser, a near-infrared laser, and/or a visible laser having a wavelength in a range from about 400 to about 2000 nm. The input light may be transmitted or reflected from a spatial light modulator, and the input light may be directed into the optical fiber. The reflected input light may be directed into the optical fiber through a microscope objective.

In yet further embodiments, an input light in a pulse mode may be directed through the optical fiber to write a diffraction pattern into the optical material to compensate for the determined misalignment. The input light may be configured to write the diffraction pattern into the optical material using two-photon based photo-polymerization and/or laser machining. The diffraction pattern may be configured to redirect the input light reflected from the target device into the optical fiber to compensate for the misalignment.

According to some examples, systems to provide direct imaging through an optical fiber for coupling optimization with a target device are described. An example system may include an optical fiber, an input light configured to be directed through an input end of the optical fiber to establish direct imaging through the optical fiber, and a target device to be coupled to an output end of the optical fiber, where a position and an orientation of a target device are adjusted to enhance an alignment of the target device for coupling with the output end of the optical fiber based on the established direct imaging.

In other examples, the input light may be a laser beam having a uniform beam profile. The input light may be reflected from a spatial light modulator, and directed into the optical fiber through a microscope objective. The direct imaging through the optical fiber may be established through observation of a light pattern of the input light at the output end of the optical fiber, and determination of one or more transmission properties of the optical fiber based on the observed light pattern. A phase mask may be applied to the input light based on the determined transmission properties to produce a focused light at the output end of the optical fiber, where the phase mask may be selected to compensate for light transmission perturbations induced by the determined transmission properties of the optical fiber. A light pattern of the input light at the output end of the optical fiber may be recorded through a charge coupled device (CCD) camera. The recorded light pattern may represent an interference between optical modes of different amplitudes and phases of the input light determined by propagation of the input light through the optical fiber.

In further examples, transmission properties of the optical fiber may be determined through an iterative application of a series of different phase masks to the input light, a recordation of a resultant output light pattern for each phase mask, and a determination of the transmission properties of the optical fiber based on the resultant output light pattern for each phase mask. The transmission properties of the optical fiber may be determined through a genetic algorithm, a continuous sampling algorithm, a transmission matrix, and/or a partition algorithm. The target device may be mounted on a translation stage, where the translation stage may be a precision alignment tool configured to adjust the position and the orientation of the target device with at least 1 μm accuracy. The position and the orientation of the target device may be determined through application of one or more imaging modalities selected to generate an image of the target device, and where the one or more imaging modalities include a confocal microscopy, a bright-field microscopy, a dark-field microscopy, and/or a phase-contrast microscopy.

In yet further examples, the system may also include a charge coupled device (CCD) camera positioned at an input end of the optical fiber, the CCD camera configured to collect light reflected from the target device via a non-polarizing beam splitter in an epi-illumination configuration. The position and the orientation of a target device may be determined through a scan of a produced focus over the target device at the output end of the optical fiber, a collection of light reflected from the scan of target device at the CCD camera, and a transformation of the collected light into an image of the target device. The optical fiber may be a single mode fiber or a multi-mode fiber. In a predefined fixed arrangement, the optical fiber may be wrapped one or more times around a spool and held under a predefined tension.

According to some embodiments, systems to provide direct imaging through an optical fiber for coupling optimization with a target device are described. An example system may include the optical fiber, an input light configured to be directed through an input end of the optical fiber to establish direct imaging through the optical fiber, a controller configured to control the input light, and a target device optically coupled via an optical material to an output end of the optical fiber. A misalignment of the target device relative to the output end of the optical fiber may be determined based on the established direct imaging, and an optical property of the optical material may be adjusted to compensate for the determined misalignment.

In other embodiments, the input light may be configured to adjust a refractive index of the optical material to compensate for the determined misalignment. A phase mask may be configured to be applied to the input light based on determined transmission properties of the optical fiber based on an observed light pattern at the output end of the optical fiber to produce a focused light at the output end of the optical fiber. The input light to adjust the optical property of the optical material may be an index adjustment light, where the index adjustment light may be a pulsed laser beam.

In further embodiments, the controller may be configured to convert the input light from a continuous imaging mode to a pulse mode. The input light may be selected from a titanium doped sapphire laser, a semiconductor laser, a diode pumped solid state laser, a near-infrared laser, and/or a visible laser having a wavelength in a range from 400 to about 2000 nm. The controller may be further configured to direct the input light in a pulse mode through the optical fiber to write a diffraction pattern into the optical material to compensate for the determined misalignment.

According to some examples, devices to enhance alignment of a target device with an optical fiber are described. An example device may include an imaging device configured to enable direct imaging through the optical fiber optically coupled via an optical material at an output end of the optical fiber to a target device, and a microscope objective configured to direct an input light from a light source through an input end of the optical fiber. The example device may also include a controller configured to control the input light to adjust an optical property of the optical material to compensate for a determined misalignment of the target device with the optical fiber.

In other examples, the input light may be configured to adjust a refractive index of the optical material to compensate for the determined misalignment. The input light to adjust the optical property of the optical material may be an index adjustment light, where the index adjustment light may be a pulsed laser beam.

According to some embodiments, apparatuses to enhance alignment of a target device with an optical fiber are described. An example apparatus may include an input light configured to be directed through an input end of an optical fiber to establish direct imaging through the optical fiber, a controller configured to control an index adjustment light, and a target device optically coupled via an optical material to an output end of the optical fiber. A misalignment of the target device relative to the output end of the optical fiber may be determined based on the established direct imaging, and an index adjustment light may be configured to adjust an optical property of the optical material to compensate for the determined misalignment.

In other embodiments, the index adjustment light may be configured to adjust a refractive index of the optical material to compensate for the determined misalignment. The index adjustment light may be a pulsed laser beam. The optical material may be an optical adhesive.

In some examples, optical coupling between and an optical fiber and a target device may be improved by directing laser light down the fiber to write an optical element such as a diffractive optical element, such as a diffraction pattern (e.g. a diffraction grating) into an optical material, such as an optical adhesive. The optical material may be located proximate, substantially adjacent, or adjacent the fiber end. For example, an optical material may be located between the fiber end and the target device. The target device may be (or comprise) a light emitting diode, laser, waveguide, second fiber, optical sensor, other optoelectronic device, and the like. The optical element, which may comprise a diffraction pattern laser-written in the optical material, may be formed in the optical material and configured to correct for a misalignment of the optical fiber and the target device. For example, the optical element may modify the direction of the light, for example by diffraction, refraction, or a combination of optical effects, emerging from the optical fiber (and/or directed towards the optical fiber). For example, a phase mask, which may include a diffraction pattern, may be formed in the optical material for improved optical coupling between the optical fiber and the target device. A diffractive optical element may be configured to produce a particular output profile, for example to correct or otherwise improve an existing misalignment between the optical fiber and the target device. Optical coupling to and/or from an optical fiber may be achieved. In some examples, optical coupling with an optoelectronic package proximate the fiber end may be improved.

In some examples, an optical element may comprise a diffraction grating and/or a Fresnel lens and be configured to correct for lateral displacement and focus. In some examples, a precursor optical element (such as a Fresnel lens and/or diffraction pattern) may be formed initially formed in the optical material by any suitable approach, then modified in situ by radiation directed down the fiber after an initial coupling to improve the optical coupling. In some examples, correction of an existing misaligned attachment may be achieved using an optical element is that is written (e.g. in the optical material) with light guided down the fiber. Example optical materials include polymer materials that can be photo-polymerized (and/or cross-linked, densified, and the like) by direct laser writing.

In some examples, an optical material may comprise a hybrid organic-inorganic polymer material, such as a material based on reaction of silicon compounds, such as silanes, by a sol-gel process. In some examples, the optical material may comprise an ormosil. In some examples, an optical material may comprise a UV photoreactive Ormocer™ polymeric material (Fraunhofer Institut für Silicatforschung ISC, Würzburg, Germany). In some examples, an optical material may comprise a Norlands™ optical adhesive (Norlands Products, Cranbury, N.J.). In some examples, the optical material may comprise a UV curable polymer, such as a mercapto-ester photopolymer, acrylic photopolymer, urethane photopolymer, and the like.

In some examples, methods and apparatus may be used to improve alignment to and/or within optical fiber pigtailed optoelectronic devices.

In some examples, imaging through an optical fiber allows improvement of optical alignment of fiber-coupled optoelectronic components, and also other types of optical interconnections, such as where multiple transverse modes are supported. In some examples, the transmission matrix of a wave-guiding structure can be mapped, and used as an imaging element. Imaging may be achieved through a single mode fiber, for example using wavelengths shorter than the specified single-mode wavelength range, and used to generate higher order transverse modes suitable for imaging. For example, a standard telecoms single mode fiber rated as single mode at 1500 nm may support a plurality of modes for visible light radiation, for example 10 optical modes for green light. In some examples, cladding modes may be accessed by guiding light at the cladding-jacket interface. This may provide a plurality of modes, in some examples several tens or hundreds of modes, which may be used to achieve improved spatial resolution in imaging. Single mode fibers may be designed to suppress cladding modes using a high refractive index jacket, but patch cables may be used to support cladding modes for alignment purposes. In some examples, an example method allows placement of an optical package on a circuit board for connecting a fiber to a waveguide without need for precision alignment and without the need to power up the equipment to facilitate the alignment. Advantages may include lower cost, relaxed tolerances and more flexible manufacturing, as in some examples the improved alignment may be achieved without powering the target device, to which the optical fiber is to be coupled.

For optical interconnections that have been previously established using coarse alignment, through-fiber imaging may be used for improving the coupling efficiency between the target device and the optical fiber. This may be referred to as optical trimming. An appropriate diffractive optical element may be formed in an optical material, such as an optical adhesive, and configured to improve the optical coupling of the fiber and a device (such as an LED, laser, other optical emitter, waveguide, other optical fiber, other optical guiding structure, sensor, or other radiation emitting and/or receiving device). In some examples, a fiber end may be coupled (e.g. butt-coupled) to an optical device using an optical material such as an optical adhesive. An iteration of phase masks may be applied, for example using a spatial light modulator (or other phase mask generator), and the intensity pattern may be analyzed for light reflected from the device surface. An image of the optical device relative to the fiber end may be used to assess the degree of misalignment of the device relative to the fiber. In some example, a laser source, such as a pulsed laser source, may be used to write an optical element such as a diffraction pattern into the optical material, for example using photoreactive effects such as photopolymerization (e.g. two-photon photo-polymerization), or a photophysical effect such as laser machining (e.g. using photoablation). A laser source may be configured to switch between continuous wave (e.g. for imaging) and pulsed mode operation (e.g. for optical element generation, e.g. having a relatively high intensity, and used as index adjustment light). Laser operation and mode selection may be, for example, under the electrical control of a controller. The laser source may be a titanium doped sapphire laser, or other solid state laser such as a semiconductor laser, such as a laser diode. An optical element may be configured to redirect the light passing through the optical element (relative to light passing through the previously unmodified optical material), thereby at least partially compensating for an existing misalignment and improving optical coupling between the optical fiber and the target device. If the beam profile of the laser is known, an optical element, such as one comprising a diffractive element, may be formed that is configured to improve optical matching for the shape of the laser radiation mode to the fiber core. In this way, coupling may be improved between an optical fiber and asymmetric light emission from a target device, such as the asymmetrically diverging, elliptical beam profile of an edge-emitting laser. In some examples, an elliptical or other non-circular cross-section emission profiled may be modified by passing through the optical element to provide a circular cross-section for improved matching to an optical fiber.

In some examples, a method to enhance optical coupling between a target device and an optical fiber comprises establishing direct imaging through the optical fiber to generate a real-time image of a target device positioned near an output end of the optical fiber; interrogating a position and an orientation of a target device to be coupled to the output end of the optical fiber based on the real-time image of the target device; and adjusting the position and the orientation of the target device to enhance an alignment of a target device for coupling with the optical fiber. The target device may be an optoelectronic device including one or more of: a light-emitting diode, a laser diode, and a modulator. An example method may further include coupling an optical connector of the target device with the optical fiber. The input light may be a laser beam having a substantially uniform beam profile. An example method may further comprise mounting the target device in a vicinity of the output end of the optical fiber on a translation stage. The translation stage may be a precision alignment tool configured to adjust the position and the orientation of the target device with at least 1 micron accuracy. An example method may further comprise positioning a CCD camera at an input end of the optical fiber to collect light reflected from the target device via a non-polarizing beam splitter in an epi-illumination configuration. Interrogating the position and the orientation of the target device may comprise scanning a produced focus over the target device at the output end of the optical fiber; collecting light reflected from the scanning of the target device at the CCD camera; and transforming the collected reflected light into an image of the target device. The optical fiber may be a single mode fiber or a multi-mode fiber. An example method may further comprise affixing the target device to the output end of the optical fiber with an optical material.

In some examples, a method to enhance optical coupling between a target device and an optical fiber comprises establishing direct imaging through the optical fiber to generate a real-time image at an output end of the optical fiber employing an input light directed through an input end of the optical fiber; interrogating a position and an orientation of a target device coupled via an optical material to the output end of the optical fiber based on the real-time image at the output end of the optical fiber; determining a misalignment of the target device relative to the output end of the optical fiber; and directing an index adjustment light through the optical fiber to adjust a refractive index of the optical material to compensate for the determined misalignment. An example method may further comprise maintaining a predetermined tension on the optical fiber by wrapping the optical fiber one or more times around a spool in a predefined fixed arrangement, and the optical material may be an optical adhesive. Establishing direct imaging through the optical fiber comprises: observing a light pattern of the input light reflected from a surface of the target device coupled to the output end of the optical fiber; determining transmission properties of the optical fiber based on the observed light pattern; and applying a phase mask to the input light based on the determined transmission properties to produce a focused light at the output end of the optical fiber. Determining transmission properties of the optical fiber based on the observed light pattern may comprise iteratively applying a series of different phase masks to the input light; recording a resultant output light pattern for each phase mask; and determining the transmission properties of the optical fiber based on the recorded resultant output light pattern for each phase mask.

In some examples, a system to provide direct imaging through an optical fiber for coupling optimization with a target device comprises an optical fiber, an input light configured to be directed through an input end of the optical fiber to establish direct imaging through the optical fiber, and a target device to be coupled to an output end of the optical fiber, wherein a position and an orientation of a target device are adjusted to enhance an alignment of the target device for coupling with the output end of the optical fiber based on the established direct imaging. The input light may a laser beam having a uniform beam profile. The input light may be reflected from a spatial light modulator, and directed into the optical fiber through a microscope objective. Direct imaging through the optical fiber may established through observation of a light pattern of the input light at the output end of the optical fiber, and determination of one or more transmission properties of the optical fiber based on the observed light pattern. A phase mask may be applied to the input light based on the determined transmission properties to produce a focused light at the output end of the optical fiber. The phase mask may be selected to compensate for light transmission perturbations induced by the determined transmission properties of the optical fiber. A light pattern of the input light at the output end of the optical fiber may be recorded through a charge coupled device (CCD) camera. The recorded light pattern may represent an interference between optical modes of different amplitudes and phases of the input light determined by propagation of the input light through the optical fiber. Transmission properties of the optical fiber may be determined through an iterative application of a series of different phase masks to the input light, a recordation of a resultant output light pattern for each phase mask, and a determination of the transmission properties of the optical fiber based on the resultant output light pattern for each phase mask. The transmission properties of the optical fiber may be determined through one or more of: a genetic algorithm, a continuous sampling algorithm, a transmission matrix, and a partition algorithm. The target device may be mounted on a translation stage, which may be a precision alignment tool configured to adjust the position and the orientation of the target device with at least 1 micron accuracy. The position and the orientation of the target device may be determined through application of one or more imaging modalities selected to generate an image of the target device, and wherein the one or more imaging modalities include at least one from a set of: a confocal microscopy, a bright-field microscopy, a dark-field microscopy, and a phase-contrast microscopy. A system may further comprise a charge coupled device (CCD) camera positioned at an input end of the optical fiber, the CCD camera configured to collect light reflected from the target device via a non-polarizing beam splitter in an epi-illumination configuration. The position and the orientation of a target device may be determined through a scan of a produced focus over the target device at the output end of the optical fiber, a collection of light reflected from the scan of target device at the CCD camera, and a transformation of the collected light into an image of the target device. The optical fiber may be one of: a single mode fiber or a multi-mode fiber. A system may comprise, in a predefined fixed arrangement, the optical fiber may be wrapped one or more times around a spool and held under a predefined tension.

In some examples, a system to provide direct imaging through an optical fiber for coupling optimization with a target device comprises: an optical fiber; an input light configured to be directed through an input end of the optical fiber to establish direct imaging through the optical fiber; a controller configured to control the input light; and a target device optically coupled via an optical material to an output end of the optical fiber, wherein a misalignment of the target device relative to the output end of the optical fiber is determined based on the established direct imaging, and wherein the input light is configured to adjust an optical property of the optical material to compensate for the determined misalignment. The input light may be configured to adjust a refractive index of the optical material to compensate for the determined misalignment. An example system may further comprise a phase mask configured to be applied to the input light based on determined transmission properties of the optical fiber based on an observed light pattern at the output end of the optical fiber to produce a focused light at the output end of the optical fiber. The input light to adjust the optical property of the optical material may be an index adjustment light, such as a pulsed laser beam. The controller may configured to convert the input light from a continuous imaging mode to a pulse mode, for example by switching the mode of operation of a laser from continuous mode to pulsed mode. The input light may be selected from one or more of: a titanium doped sapphire laser, a semiconductor laser, a near-infrared laser, a visible laser having a wavelength in a range from 650 nm to 400 nm, or other laser. A laser may include a wavelength-adjusting element, such as a nonlinear optical element. The controller may be further configured to select the input light as a pulsed laser mode, the input light being transmitted through the optical fiber to write an optical element such as a diffraction pattern into the optical material to compensate for the determined misalignment.

In some examples, a device to enhance alignment of a target device with an optical fiber comprises an imaging device configured to enable direct imaging through an optical fiber, optically coupled via an optical material at an output end of the optical fiber to a target device; a lens such as a microscope objective configured to direct an input light from a light source through an input end of the optical fiber; and a controller configured to control the input light to adjust an optical property of the optical material to compensate for a determined misalignment of the target device with the optical fiber. A device may be configured to allow an operator, such as a technician, to perform an improved alignment method. For example, a device may be a handheld device with a dedicated power supply, and may be configured to allow improvement of alignment without powering on the device. For example, the hand held device may include a light source, such as a laser, used to image through the fiber and create the optical element, e.g. through laser writing in an optical material. The input light may be configured to adjust a refractive index of the optical material to compensate for the determined misalignment. The input light may be configured (e.g. have a selected wavelength) to adjust the optical property of the optical material, for example as an index adjustment light. The wavelength of the index adjustment light may be the same or different as the wavelength used for imaging. For example, the imaging wavelength may be a visible wavelength (e.g. in the red-green wavelength range) and the index adjustment light may comprise a UV and/or a near-UV (e.g. violet) light. The index adjustment light may be a pulsed laser beam.

In some examples, an apparatus to enhance alignment of a target device with an optical fiber, the apparatus comprising: an input light configured to be directed through an input end of an optical fiber to establish direct imaging through the optical fiber; a controller configured to control an index adjustment light; and a target device optically coupled via an optical material to an output end of the optical fiber, wherein a misalignment of the target device relative to the output end of the optical fiber is determined based on the established direct imaging, and wherein index adjustment light is configured to adjust an optical property of the optical material to compensate for the determined misalignment. The index adjustment light may be configured to adjust a refractive index of the optical material to compensate for the determined misalignment. The index adjustment light may be a pulsed laser beam, in some examples a pulsed UV beam. The optical material may be an optical adhesive, which may comprise a photopolymer having a refractive index adjustable by exposure to radiation. The wavelength of the index adjustment light may be within a photorefractive wavelength range of the optical material.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected," or "operably coupled," to each other to achieve the particular functionality, and any two components capable of being so associated may also be viewed as being "operably couplable," to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to enhance optical coupling between a target device and an optical fiber, the method comprising:
   establishing direct imaging through the optical fiber to generate a real-time image of the target device positioned near an output end of the optical fiber;
   interrogating a position and an orientation of the target device to be optically coupled via an optical material to the output end of the optical fiber based on the real-time image of the target device; and
   adjusting, in response to the interrogation, an optical property of the optical material to compensate for a misalignment of the target device relative to the output end of the optical fiber, to enhance an alignment of the target device for coupling with the output end of the optical fiber.

2. The method of claim 1, wherein establishing direct imaging through the optical fiber comprises:

directing an input light through an input end of the optical fiber;

observing a light pattern of the input light at one of the output end and the input end of the optical fiber;

determining transmission properties of the optical fiber based on the observed light pattern; and applying a phase mask to the input light based on the determined transmission properties to produce a focused light at the output end of the optical fiber.

3. The method of claim 2, further comprising:

selecting the phase mask to compensate for light transmission perturbations induced by the determined transmission properties of the optical fiber.

4. The method of claim 2, further comprising:

reflecting the input light from a spatial light modulator; and directing the reflected input light into the optical fiber through a microscope objective.

5. The method of claim 2, further comprising:

recording the light pattern of the input light at the output end of the optical fiber at a charge coupled device (CCD) camera, wherein the recorded light pattern represents an interference between optical modes of different amplitudes and phases of the input light determined by a propagation of the input light through the optical fiber.

6. The method of claim 2, wherein determining the transmission properties of the optical fiber based on the observed light pattern comprises:

iteratively applying a series of different phase masks to the input light;

recording a resultant output light pattern for each phase mask of the series of different phase masks; and determining the transmission properties of the optical fiber based on the resultant output light pattern for each phase mask of the series of different phase masks that employs one or more of: a genetic algorithm, a continuous sampling algorithm, a transmission matrix, and a partition algorithm.

7. The method of claim 1, wherein interrogating the position and the orientation of the target device comprises:

applying one or more imaging modalities selected to generate an image of the target device, wherein the one or more imaging modalities include at least one of: a confocal microscopy, a bright-field microscopy, a dark-field microscopy, and a phase-contrast microscopy.

8. The method of claim 1, further comprising:

determining the misalignment of the target device relative to the output end of the optical fiber, and directing an index adjustment light through the optical fiber to adjust a refractive index of the optical material to compensate for the determined misalignment, wherein the index adjustment light is a pulsed laser beam.

9. The method of claim 8, further comprising:

directing an input light in a pulse mode through the optical fiber to write a diffraction pattern into the optical material.

10. The method of claim 9, further comprising:

writing the diffraction pattern using one or more of: two-photon based photo-polymerization or laser machining, wherein the diffraction pattern redirects the input light reflected from the target device into the optical fiber to compensate for the determined misalignment.

11. A system to provide direct imaging through an optical fiber for coupling optimization with a target device, the system comprising:

the optical fiber;

an input light configured to be directed through an input end of the optical fiber to establish direct imaging through the optical fiber;

a controller configured to control the input light; and the target device to be coupled via an optical material to an output end of the optical fiber, wherein a position and an orientation of the target device are adjusted in response to determination of a misalignment of the target device relative to the output end of the optical fiber, to enhance an alignment of the target device to couple with the output end of the optical fiber based on the established direct imaging, and wherein the position and the orientation of the target device are adjusted by use of an index adjustment light that is configured to adjust a refractive index of the optical material to compensate for the determined misalignment.

12. The system of claim 11, wherein the input light is a laser beam that has a uniform beam profile selected from one or more of: a solid state laser, a titanium doped sapphire laser, a semiconductor laser, a near-infrared laser, and a visible laser that has a wavelength in a range from about 400 to about 2000 nm.

13. The system of claim 11, wherein the target device is mounted on a translation stage, and wherein the translation stage Ls configured to adjust the position and the orientation of the target device with at least 1 μm accuracy.

14. The system of claim 11, further comprising:

a charge coupled device (CCD) camera positioned at the input end of the optical fiber, wherein the CCD camera is configured to collect light reflected from the target device via a non-polarizing beam splitter in an epi-illumination configuration.

15. The system of claim 14, wherein the position and the orientation of the target device are determined through a scan of a produced focus over the target device at the output end of the optical fiber, a collection of light reflected from the scan of target device at the CCD camera, and a transformation of the collected light into an image of the target device.

16. The system of claim 11, wherein the controller is configured to convert the input light from a continuous imaging mode to a pulse mode.

17. An apparatus to enhance alignment of a target device with an optical fiber, the apparatus comprising:

an input light configured to be directed through an input end of the optical fiber to establish direct imaging through the optical fiber;

a controller configured to control an index adjustment light; and the target device optically coupled via an optical material to an output end of the optical fiber, wherein a misalignment of the target device relative to the output end of the optical fiber is determined based on the established direct imaging, and wherein the index adjustment light is configured to adjust a refractive index of the optical material to compensate for the determined misalignment.

18. The apparatus of claim 17, wherein the target device is an optoelectronic device that includes one or more of: a light-emitting diode, a laser diode, a sensor, an optical router, and a modulator.

19. The apparatus of claim 17, wherein the optical fiber is one of: a single mode fiber or a multi-mode fiber wrapped one or more times around a spool and held under a predefined tension.

20. The apparatus of claim 17, wherein the optical material is an optical adhesive.

* * * * *

UNITED STATES PATENT AND TRADEMARK OFFICE
CERTIFICATE OF CORRECTION

PATENT NO. : 9,891,393 B2  
APPLICATION NO. : 14/340511  
DATED : February 13, 2018  
INVENTOR(S) : Reece Page 1 of 2

It is certified that error appears in the above-identified patent and that said Letters Patent is hereby corrected as shown below:

In the Specification

In Column 3, Line 24, delete "product;" and insert -- product, --, therefor.

In Column 5, Line 51, delete "can also been" and insert -- can also be --, therefor.

In Column 9, Line 11, delete "one more" and insert -- one or more --, therefor.

In Column 9, Line 11, delete "as a level" and insert -- as a --, therefor.

In Column 9, Line 63, delete "solid state drives," and insert -- solid state drives (SSDs), --, therefor.

In Column 10, Line 61, delete "automated" and insert -- automated. --, therefor.

In Column 12, Line 16, delete "medium 602" and insert -- signal bearing medium 602 --, therefor.

In Column 12, Line 29, delete "hard disk drive," and insert -- hard disk drive (HDD), --, therefor.

In Column 12, Line 30, delete "solid state drive," and insert -- solid state drive (SSD), --, therefor.

In Column 12, Line 40, delete "program product 600" and insert -- computer program product 600 --, therefor.

In Column 22, Line 29, delete "and or" and insert -- and/or --, therefor.

In Column 22, Line 56, delete "hard disk drive," and insert -- hard disk drive (HDD), --, therefor.

In Column 22, Lines 60-61, delete "communications link," and insert -- communication link, --, therefor.

Signed and Sealed this  
Twenty-fourth Day of April, 2018

Andrei Iancu  
*Director of the United States Patent and Trademark Office*

In Column 23, Line 56, delete "recitation no" and insert -- recitation, no --, therefor.

In Column 24, Line 11, delete "general such" and insert -- general, such --, therefor.

In the Claims

In Column 25, Line 51, in Claim 8, delete "fiber, and" and insert -- fiber; and --, therefor.

In Column 26, Line 31, in Claim 13, delete "stage Ls configured" and insert -- stage is configured --, therefor.